US012775521B2

(12) United States Patent
Cheng et al.

(10) Patent No.: US 12,775,521 B2
(45) Date of Patent: Oct. 27, 2026

(54) REGULATED BLOCK FOLDING FOR MEMORY DEVICES

(71) Applicant: Micron Technology, Inc., Boise, ID (US)

(72) Inventors: Chao-Han Cheng, San Jose, CA (US); Jen Hung Liao, Zhubei City (TW); Li-Te Chang, San Jose, CA (US); Chia-Wei Chang, Hsinchu City (TW); Chung An Hsu, New Taipei City (TW)

(73) Assignee: Micron Technology, Inc., Boise, ID (US)

( * ) Notice: Subject to any disclaimer, the term of this patent is extended or adjusted under 35 U.S.C. 154(b) by 28 days.

(21) Appl. No.: 18/930,556

(22) Filed: Oct. 29, 2024

(65) Prior Publication Data

US 2026/0119318 A1 Apr. 30, 2026

(51) Int. Cl.
*G06F 11/00* (2006.01)
*G06F 11/10* (2006.01)

(52) U.S. Cl.
CPC ...... *G06F 11/1068* (2013.01); *G06F 11/1004* (2013.01); *G06F 11/1016* (2013.01)

(58) Field of Classification Search
CPC ............. G06F 11/1068; G06F 11/1004; G06F 12/107; G06F 11/07
See application file for complete search history.

(56) References Cited

U.S. PATENT DOCUMENTS 9,483,340 B1 * 11/2016 Johnson ................ G06F 11/076
11,385,984 B2 * 7/2022 Yang .................. G06F 11/3034
11,658,846 B2 * 5/2023 Yu ......................... H04L 1/0026 375/225
12,020,751 B2 * 6/2024 Sharon .................. G11C 29/52

* cited by examiner

*Primary Examiner* — Esaw T Abraham
(74) *Attorney, Agent, or Firm* — Schwegman Lundberg & Woessner, P.A.

(57) ABSTRACT

A processing device identifies a block from a set of blocks of a memory device that is classified in the highest bin among multiple bins based on a block family error avoidance (BFEA) scan of the block. Based on determining the block is classified in the highest bin, the processing device determines whether a bit error rate of the block satisfies a bit error rate threshold condition. The bit error rate threshold condition comprises a tuning parameter applied to a bit error rate threshold. Based on the bit error rate of the block satisfies the bit error rate threshold condition, the processing device adds the block to a block folding queue.

20 Claims, 4 Drawing Sheets

REGULATED BLOCK FOLDING FOR MEMORY DEVICES

TECHNICAL FIELD

Embodiments of the disclosure relate generally to memory sub-systems and, more specifically, to techniques for performing a regulated block folding in a memory device.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
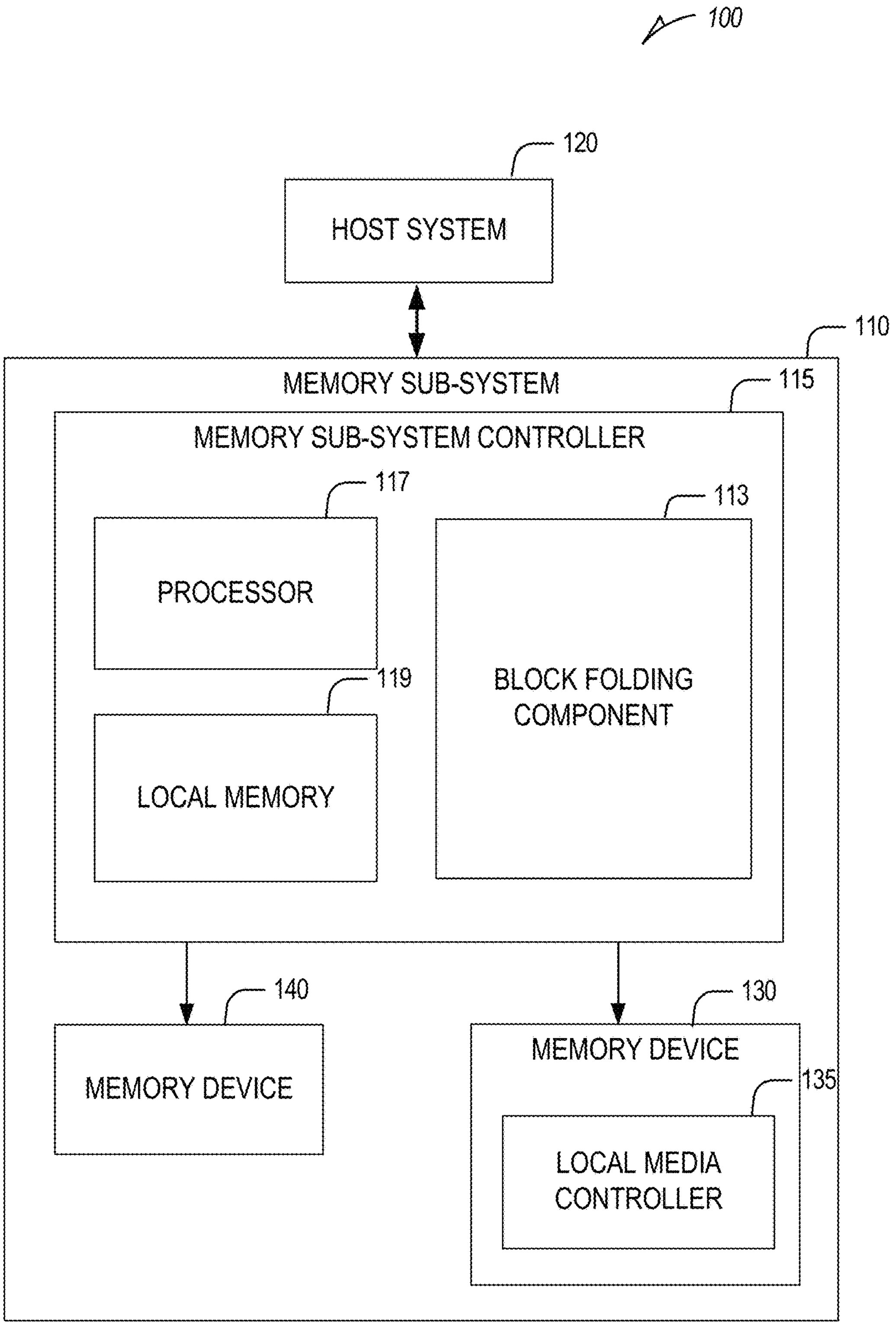
FIG. 1 illustrates an example computing environment that includes a memory sub-system, in accordance with some examples.

Aspects of the present disclosure are directed to an approach for performing regulated block folding in a memory device at memory sub-system boot-up. A memory sub-system can be a memory device (e.g., solid-state drive [SSD]), a memory module, or a combination of a memory device and memory module. Examples of memory devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

A memory device can be a non-volatile memory device. One example of a non-volatile memory device is a negative-and (NAND) memory device. A NAND memory device can include multiple NAND dies. Each die may include one or more planes, and each plane includes multiple blocks. Each block includes an array that includes pages (rows) and strings (columns). A string includes a plurality of memory cells connected in series. A memory cell (also referred to herein simply as a "cell") is an electronic circuit that stores information. Depending on the cell type, a cell can store one or more bits of binary information and has various logic states that correlate to the number of bits being stored. The logic states can be represented by binary values, such as "0" and "1," or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. Data can be written to a block, page-by-page. During write operations, data is programmed into a block of the memory device using a programming sequence that includes multiple passes in which programming pulses are applied to cells in the block. Over the multiple passes, the programming pulses configure the threshold voltages (Vt) of the cells in each page according to the value that the cells are intended to represent. As the programming sequence progresses, the voltage level of the programming pulses increases until a target voltage level for each cell is reached.

The Vt distribution of a memory cell can be divided into a number of regions based on the number of bits stored by the cell where each region corresponds to a value that can be represented by the cell. More specifically, each region corresponds to a read level, and each read level decodes into a multi-bit value. For example, a TLC NAND flash cell can be at one of eight charge levels (L0, L1, L2, L3, L4, L5, L6, or L7) and each charge level decodes into a 3-bit value that is stored in the flash cell (e.g., 111, 110, 100, 000, 010, 011, 001, and 101).

A common issue that impacts NAND memory devices is read disturbance, a phenomenon where repeated read operations on a specific memory cell can impact the data stored in neighboring cells. A common approach to mitigate read disturbance is read disturb handling. This method involves periodically scanning word lines of a memory device to detect potential read-disturb effects. Typically, read disturb handling algorithms perform Raw Bit Error Rate (RBER) scans (also referred to herein as "RBER checks") on selected word lines based on certain triggering conditions (e.g., after a predetermined number of read operations are performed). If the RBER exceeds a predefined RBER threshold, the affected data block is "folded" to maintain data integrity. The process of folding a block generally includes copying valid data stored by the block to another block in the memory device.

For NAND-based memory device, Slow Charge Loss (SCL) of memory cells is a major degradation mechanism for data retention (DR). In particular, due to the effects of SCL, memory cells have their Vt distributions lose charge, with the highest Vt distributions typically losing charge faster than lower Vt distributions. SCL is usually a function of time and temperature, and can also be susceptible to other factors, such as cycling degradation (e.g., more Vt distribution shift for End of Life (EOL) blocks than for Beginning of Life (BOL) blocks). SCL usually causes a memory cell's Vt distribution to shift lower (e.g., causes the Vt distribution valley to shift lower) right after the memory cell is programmed.

Generally, to read data from a memory cell, one or more read level voltages are applied to the gate of a transistor (of the memory cell) to determine (e.g., sense) the value of the current threshold voltage (e.g., the voltage at which the transistor conducts current), and the current threshold voltage value can be decoded (e.g., mapped) to a data value (e.g., bit string) stored by the memory cell. To compensate for SCL-based shift when performing a read operation on a memory cell, an offset (or read level voltage offset) is usually applied to one or more read level voltages (also referred to herein as read levels) used to read data from the memory cell. Traditionally, the read level voltage offset applied to a memory cell is determined based on SCL tracking. Tracking SCL of memory cells avoids excessive latency impact, which can be caused by error handling that results from incorrect read level placement (which can occur if a read level voltage offset applied to a read level voltage causes it to be placed without considering SCL effect on Vt distributions). Intrinsically, the effects of SCL on a memory cell hold strong dependence on a wordline (WL) group of the memory cell due to process variation (process variation that existed when the memory cell was manufactured) and asymmetric bitline (BL) cross-section at each WL. For instance, the cross-section can be larger at the top of the WL of each deck and yield smaller effective field, or the cross-section can be smaller at the bottom of the WL of each deck and yield stronger effective field. Accordingly, traditional methods for SCL tracking include performing periodic, proactive scans of blocks (comprising memory cells) and classify measured read level voltage offsets of scanned blocks into one of multiple predefined bins. Blocks with similar SCL characteristics can be grouped together in a bin to improve the management efficiency.

As an example, a block family error avoidance (BFEA) algorithm (one example of SCL tracking) can scan blocks to determine a shift of read level 7 (LVL7 or L7). The determined shift of read level 7 can be categorized into a specific bin (e.g., BFEA bin), read level voltage offsets for read levels 1 through 7 can be determined from a look-up table (LUT) (e.g., BFEA LUT) based on the specific bin (e.g., from a column of the LUT corresponding to the specific bin), and the determined read level voltage offsets can be used in a read operation (e.g., host reads) for one or more of those blocks. For example, if the shift of read level 7 of a memory cell is −23 characterized by BFEA scan, the BFEA algorithm can determine (e.g., identify) a bin (e.g., BFEA bin) that is associated with the shift of −23 (e.g., bin 5 based on example Table 1, provided below), can determine read level voltage offsets for read levels 1 through 7 from the LUT (e.g., read level voltage offsets of bin 5's column of example Table 2, provided below) based on the determined bin (e.g., column associated with the bin), and can use the one or more determined read level voltage offsets in connection with a read operation for the memory cell.

Traditionally, when a block reaches the highest BFEA bin (e.g., bin 7 in the example presented by Table 2), indicating severe SCL, it is immediately folded during background media scans (also referred to herein as "background scans"). The highest bin refers to the bin in the BFEA classification system that represents the most severe read level shifts for memory blocks. This bin is associated with the largest negative shift in read level 7 (LVL7 or L7) and corresponds to the worst condition for data retention, typically indicating blocks that require the most significant read level voltage offsets to compensate for SCL effects.

However, this approach presents challenges for applications such as automotive storage products that require significantly longer useful lifetimes compared to other applications. For examples, memory devices for automotive applications typically need to operate reliably for 12 to 15 years. The conventional method of blindly folding blocks in the highest BFEA bin can lead to excessive program-erase cycles (PEC), potentially consuming a substantial portion of the device's endurance over its extended lifetime. For example, based on characterization data for certain NAND flash devices, it takes approximately 8.3 days for freshly written data to reach the highest BFEA bin at elevated temperatures. In a 12-15 year product lifetime, this blind folding approach could consume around 500 program-erase cycles, even without additional host writes. This presents a significant challenge for managing the write amplification factor (WAF) and meeting the endurance requirements of automotive-grade NAND devices.

Aspects of the present disclosure address the above and other issues by performing regulated block folding for memory devices. The approach involves implementing an additional RBER check to determine whether folding is appropriate for blocks classified in the highest BFEA bin. Instead of blindly folding blocks in the highest bin during background media scans, the memory sub-system applies a configurable tuning parameter to the RBER threshold. This regulated folding strategy allows for extending the lifetime of blocks while maintaining data integrity and performance.

By utilizing the margin between when a block reaches the highest BFEA bin and when it actually fails to meet hard-bit decode requirements, the approach can significantly extend the usable lifetime of memory blocks. By reducing the frequency of block folding operations, the regulated approach helps to minimize write operations, thereby improving the overall WAF of the memory sub-system. The reduction in PEC usage and improved WAF contribute to better overall endurance of the memory device, allowing it to maintain its performance and reliability over the extended lifetimes required in some applications such as automotive applications. By avoiding premature folding of blocks that still meet performance requirements, the memory sub-system can operate more efficiently. This approach allows the device to maintain higher performance and reliability levels, especially as it approaches the end of its useful life. The use of a configurable RBER ratio parameter allows for fine-tuning of the folding threshold, providing flexibility to

TABLE 1

| BIN | 1 | 2 | 3 | 4 | 5 | 6 | 7 |
|---|---|---|---|---|---|---|---|
| Shift range | [−3, −8] | [−9, −13] | [−14, −16] | [−17, −21] | [−22, −26] | [−27, −32] | [−33, −>] |

TABLE 2

| BIN | 1 | 2 | 3 | 4 | 5 | 6 | 7 |
|---|---|---|---|---|---|---|---|
| LVL1 | | | | | | | |
| LVL2 | −1 | −2 | −2 | −3 | −4 | −4 | −5 |
| LVL3 | −2 | −4 | −4 | −6 | −8 | −8 | −9 |
| LVL4 | −2 | −4 | −6 | −6 | −8 | −11 | −13 |
| LVL5 | −3 | −6 | −7 | −9 | −12 | −14 | −17 |
| LVL6 | −4 | −8 | −10 | −12 | −16 | −20 | −23 |
| LVL7 | −6 | −12 | −15 | −18 | −24 | −30 | −36 |

balance performance, reliability, and endurance based on specific application requirements or changing conditions over the device's lifetime.

FIG. 1 illustrates an example computing environment 100 that includes a memory sub-system 110, in accordance with some embodiments of the present disclosure.

The memory sub-system 110 can include media, such as one or more volatile memory devices (e.g., memory device 140), one or more non-volatile memory devices (e.g., memory device 130), or a combination of such.

A memory sub-system 110 can be a memory device, a memory module, or a hybrid of a memory device and memory module. Examples of a memory device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize a Non-Volatile Memory Express (NVMe) interface to access the memory devices 130 and 140 when the memory sub-system 110 is coupled with the host system 120 by the PCIe or CXL interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a NAND type flash memory. Each of the memory devices 130 can include one or more arrays of memory cells such as single level cells (SLCs), multi-level cells (MLCs) (e.g., triple level cells (TLCs), or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 and convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130.

As shown, the memory sub-system 110 includes a block folding component 113. The block folding component 113 is responsible for managing the folding of blocks in the memory device 130. The block folding component 113 implements a regulated block folding approach that extends beyond traditional BFEA approaches. When a block is identified as being in the highest BFEA bin during a background scan (the bin associated with the most severe read level shift), the block folding component 113 performs an additional RBER check to determine if folding is appropriate. This check involves applying a configurable tuning parameter to the RBER threshold. Based on the results of this check, the block folding component 113 decides whether to add the block to a folding queue or continue the background scan without folding. For blocks not in the highest BFEA bin, the block folding component 113 applies a standard RBER threshold check where the RBER of the block is compared to the RBER threshold without a tuning parameter being applied. The block folding component 113 then manages the actual folding process for blocks in the folding queue, which involves copying valid data therefrom to new blocks.

In some embodiments, the memory sub-system controller 115 includes at least a portion of the block folding component 113. For example, the memory sub-system controller 115 can include a processor 117 (processing device) configured to execute instructions stored in local memory 119 (e.g., firmware) for performing the operations described herein. In some embodiments, the block folding component 113 is part of the host system 120, an application, or an operating system. Further details regarding the block folding component 113 are discussed below.

Figure 2:
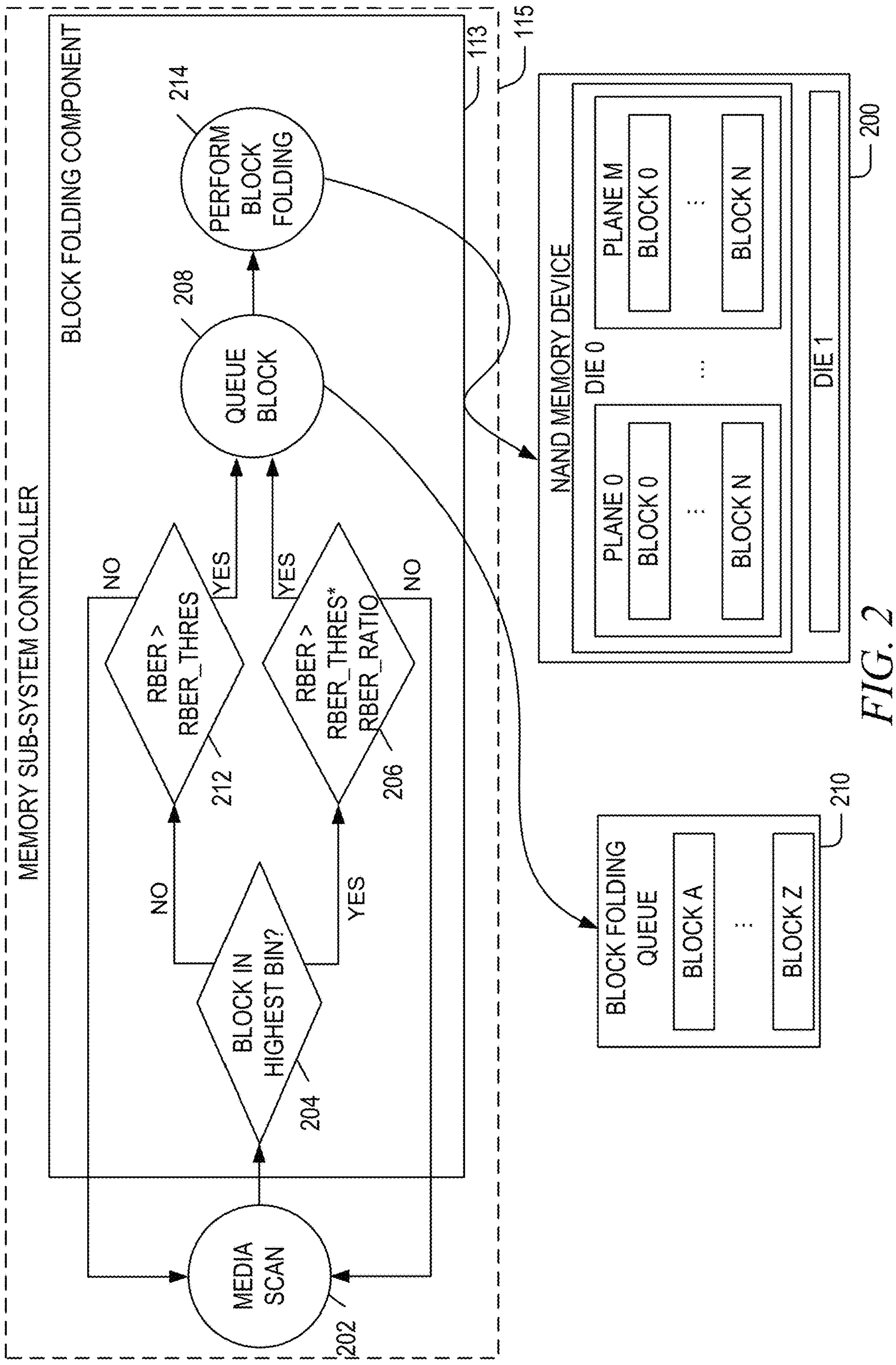
FIG. 2 is a data flow diagram illustrating interactions between components in the memory sub-system in performing regulated block folding in a memory device, in accordance with some examples.

FIG. 2 is data flow diagram illustrating interactions between components in the memory sub-system in performing regulated block folding in a memory device, in accordance with some examples. In the example illustrated in FIG. 2, the memory device 200 is an example memory device 130 in the example form of a NAND memory device.

The memory device 200 includes multiple NAND dies. Each die may include one or more planes, and each plane includes multiple blocks such as $block_0$-$block_8$ illustrated in FIG. 2. Each block includes a two- or three-dimensional array that includes pages (rows) and strings (columns). A string includes a plurality of memory cells connected in series. Each memory cell is used to represent one or more bit values. For example, a single NAND flash cell includes a transistor that stores an electric charge on a memory layer that is isolated by oxide insulating layers above and below. Within each cell, data is stored as the threshold voltage of the transistor. SLC NAND, for example, can store one bit per cell. Other types of memory cells, such as MLCs, TLCs, QLCs, and PLCs, can store multiple bits per cell. In this example, the NAND memory includes an SLC portion that includes multiple SLCs and a QLC portion that includes multiple QLCs.

As noted above, each NAND cell stores data in the form of the threshold voltage (VT) of the transistor. The range of threshold voltages of a memory cell can be divided into a number of regions based on the number of bits stored by the cell where each region corresponds to a value that can be represented by the cell. More specifically, each region corresponds to a read voltage level (also referred to simply as "read level") and each read voltage level decodes into a multi-bit value. For example, a TLC NAND flash cell can be at one of eight read levels (L0, L1, L2, L3, L4, L5, L6, or L7) and each read level decodes into a 3-bit value that is stored in the flash cell (e.g., 111, 110, 100, 000, 010, 011, 001, and 101).

Each block of the memory device 200 is classified into a bin from among multiple predefined bins based on read level shifts of the blocks (e.g., a shift of read level 7). Each bin has a corresponding read level voltage offset to apply to blocks in the bin. The bin classifications for each block of the memory device 200 are determined based on a BFEA scan, which in some examples, may be performed prior to power down of the memory sub-system 110. During the BFEA scan, the blocks are scanned to determine the shift of read level 7 (LVL7 or L7) and the determined shift of read level 7 of each block is categorized into a specific bin (e.g., BFEA bin) among the multiple predefined bins.

As shown, the memory sub-system controller 115, at operation 202, performs a background scan on the memory device to determine a state of each block. During the background scan, the memory sub-system controller 115 identifies a block and the block folding component 113 determines whether the block is classified in the highest bin (operation 204). As noted above, the highest bin is the bin associated with the most severe read level shift (e.g., bin 7 in Table 2).

If the block is classified in the highest bin, the block folding component 113 performs an RBER check to determine the RBER of the block and to determine, at operation 206, whether the RBER of the block satisfies a first threshold condition. The first threshold condition comprises a tuning parameter (RBER_RATIO) applied to an RBER threshold (RBER_THRES). In an example, the block folding component 113 determines whether the RBER of the blocks satisfies the first threshold condition based on whether the RBER of the block exceeds the product of the tuning parameter and the RBER threshold.

If the RBER of the block satisfies the first threshold condition, the block folding component 113, at operation 208, adds the block to a block folding queue 210. If the RBER of the block fails to satisfy the first threshold condition, the processing device continues the background scan (operation 202) without adding the block to the block folding queue 210.

If the block is not classified in the highest bin, the block folding component 113 performs an RBER check to determine the RBER of the block and to determine, at operation 212, whether the RBER of the block satisfies a second threshold condition. The second threshold condition comprises the RBER threshold without the tuning parameter applied. If the RBER of the block satisfies the second threshold condition, the block folding component 113 adds the block to the block folding queue 210 (operation 208). If the RBER of the block fails to satisfy the second threshold condition, the block folding component 113 continues the background scan (operation 202) without adding the block to the block folding queue 210.

The block folding component 113 folds blocks in the block folding queue, at operation 214. Although illustrated sequentially in FIG. 2, it shall be appreciated that the block folding and the background scan can be performed in parallel or otherwise independently.

The tuning parameter is configurable to allow for fine-tuning of the first threshold condition to provide flexibility to balance performance, reliability, and endurance based on specific application requirements or changing conditions over the device's lifetime. In an example, the tuning parameter can be adjusted based on the input. That is, the memory sub-system controller 115 receives input to adjust the tuning parameter, and the memory sub-system controller 115 (e.g., the block folding component 113) adjusts the tuning parameter based on the input. In subsequent iterations of the process of the process illustrated by FIG. 2, the block folding component 113 utilizes the adjusted tuning parameter in performing the first RBER check to determine if a block in the highest BFEA bin satisfies the first RBER threshold condition.

Figure 3:
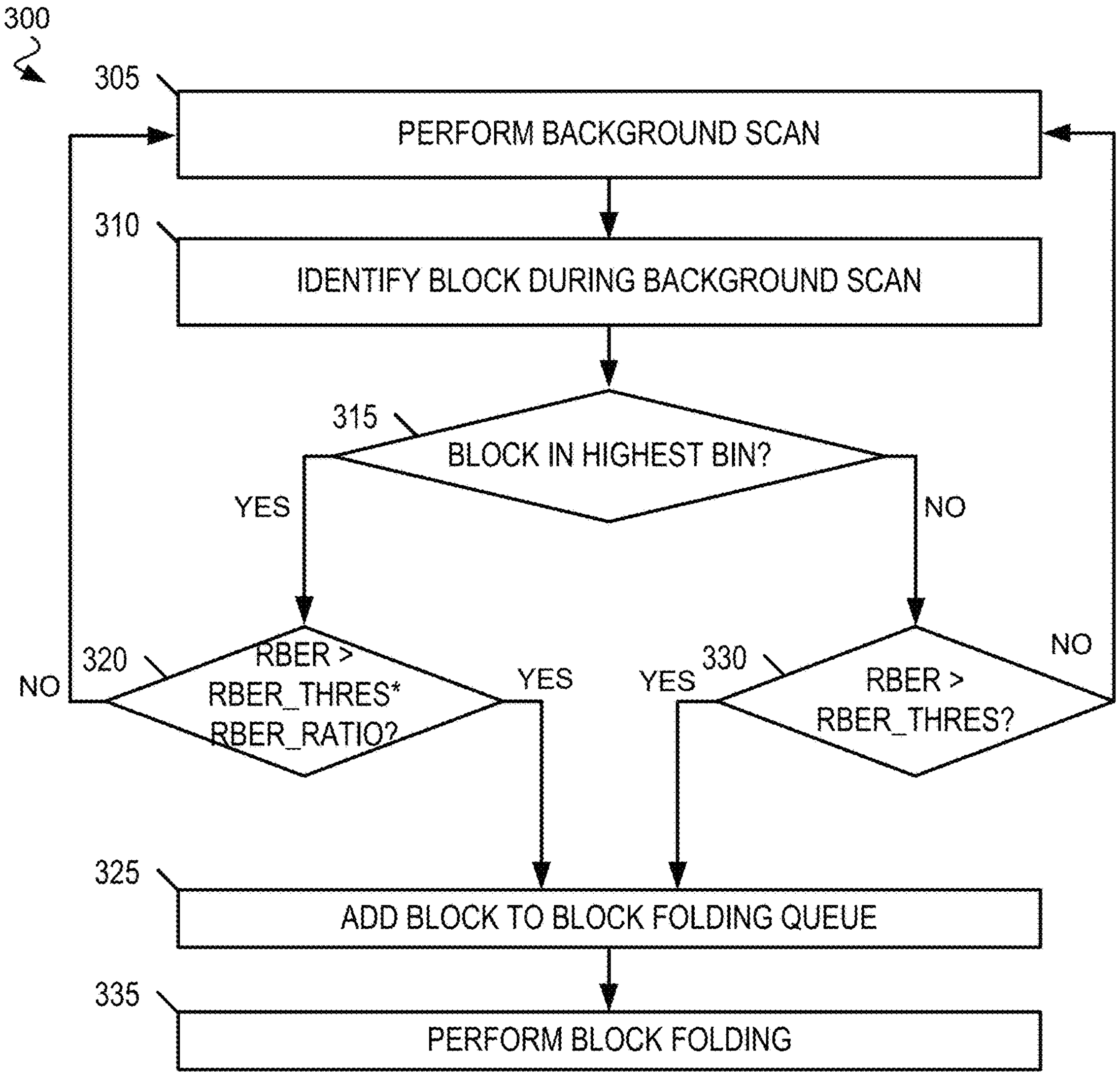
FIG. 3 is a flow diagram illustrating an example method for performing regulated block folding in a memory device, in accordance with some examples.

FIG. 3 is a flow diagram illustrating an example method 300 for performing regulated block folding in a memory device, in accordance with some examples. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the block folding component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

To set the context of method 300, the memory device includes a set of blocks. A processing device executes a background scan that patrols through the set of blocks to monitor the state of the blocks, at operation 305.

At operation 310, the processing device identifies a block during the background scan and determines, at operation 315, whether the block is classified in the highest BFEA bin. As noted above, each block in the set of blocks is classified into a bin from among multiple predefined bins based on read level shifts of the set of blocks (e.g., a shift of read level 7). The bins classifications for each block in the set of blocks are determined based on a BFEA scan, which in some examples, may be performed prior to power down of the memory sub-system. During the BFEA scan, the blocks are scanned to determine the shift of read level 7 (LVL7 or L7) and the determined shift of read level 7 of each block is categorized into a specific bin (e.g., BFEA bin) among the multiple predefined bins. The highest bin refers to the bin that represents the most severe read level shifts for memory blocks. This bin is associated with the largest negative shift in read level 7 (LVL7 or L7) and corresponds to the worst condition for data retention, typically indicating blocks that require the most significant read level voltage offsets to compensate for SCL effects.

If, at operation 315, the processing device determines that the BFEA bin classification of the block corresponds to the highest bin, the method 300 proceeds to operation 320, where the processing device determines the RBER of the block and determines whether the RBER of the block satisfies a first threshold condition. The first threshold condition comprises a tuning parameter (referenced in FIG. 3 as "RBER_RATIO") applied to an RBER threshold (referenced in FIG. 3 as "RBER_THRES"). In determining whether the RBER of the block satisfies the first threshold condition, the processing device determines whether the RBER of the block exceeds the product of the tuning parameter and the RBER threshold. If the processing device determines that the RBER of the block satisfies the first threshold condition, the processing device adds the block to a block folding queue, at operation 325.

The tuning parameter is configurable. Thus, the processing device can receive input (e.g., from a host system) to adjust the tuning parameter and adjust the tuning parameter based thereon. In subsequent iterations of the method 300, the processing device uses the adjusted tuning parameter to determine when the RBER of a block satisfies the first RBER threshold condition.

If, at operation 320, the processing device determines that the RBER of the block fails to satisfy the first threshold condition, the method returns to operation 305 where the processing device continues the background scan without adding the block to the block folding queue.

If, at operation 315, the processing device determines that the BFEA bin classification of the block does not correspond to the highest bin, the method 300 proceeds to operation 330, where the processing device determines whether the RBER of the block satisfies a second threshold condition. The second threshold condition comprises the RBER threshold without the tuning parameter applied. In determining whether the RBER of the block satisfies the second threshold condition, the processing device determines whether the RBER of the block exceeds the RBER threshold. If the processing device determines that the RBER of the block satisfies the second threshold condition, the processing device adds the block to the block folding queue, at operation 325. If, at operation 325, the processing device determines that the RBER of the block fails to satisfy the second threshold condition, the method returns to operation 305 where the processing device continues the background scan without adding the block to the block folding queue.

At operation 335, the processing device performs folding of blocks in the block folding queue. Folding a block comprises copying valid data stored by the block to another block.

Described implementations of the subject matter can include one or more features, alone or in combination as illustrated below by way of example.

[Example Section to be Completed Upon Finalization of Claims]

Figure 4:
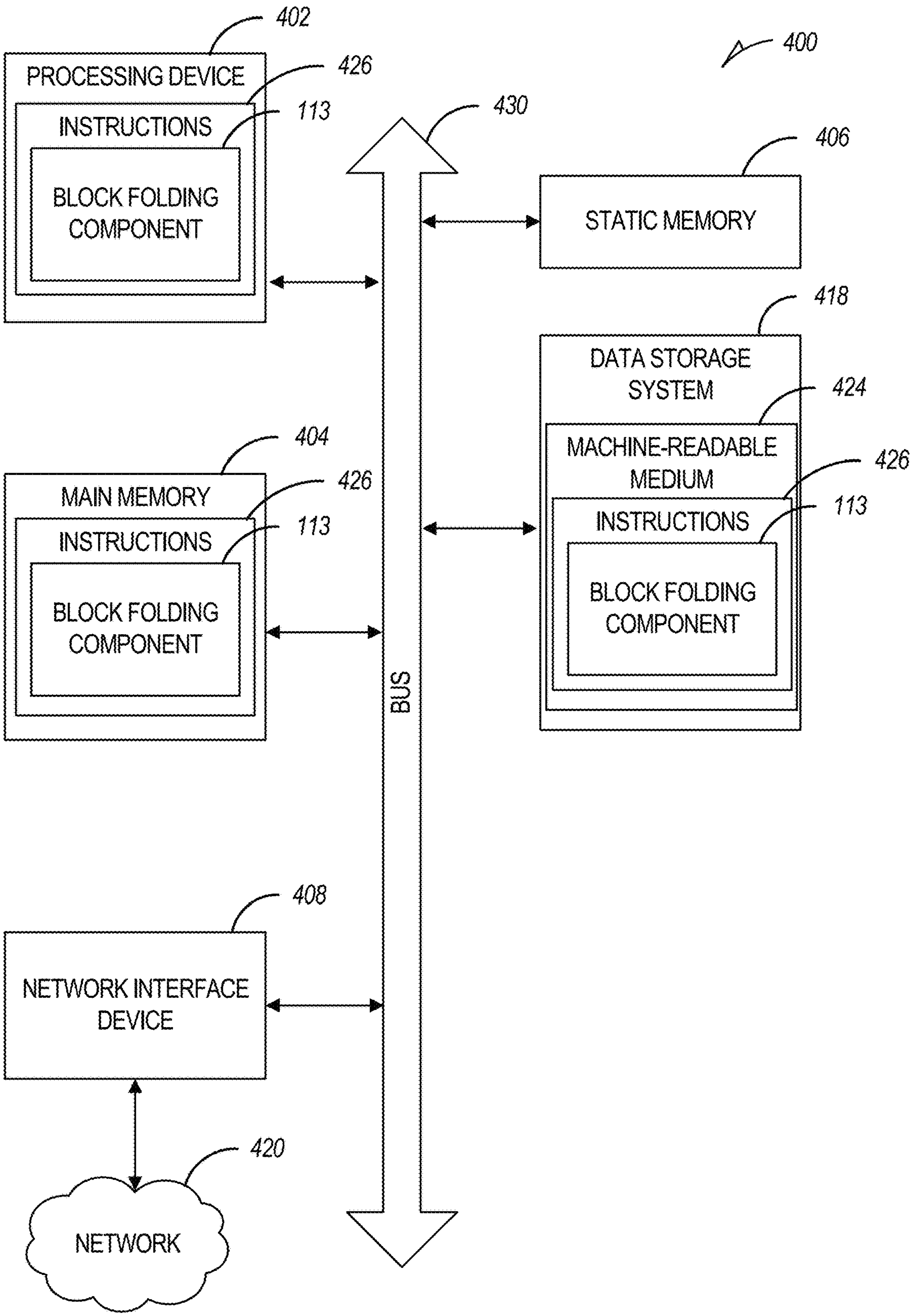
FIG. 4 is a block diagram of an example computer system in which embodiments of the present disclosure may operate.

FIG. 4 illustrates an example machine in the form of a computer system within which a set of instructions can be executed for causing the machine to perform any one or more of the methodologies discussed herein. FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the block folding component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., ROM, flash memory, DRAM such as SDRAM or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an ASIC, a FPGA, a digital signal processor (DSP), network processor, or the like. The processing device 402 is configured to execute instructions 426 for performing the operations and steps discussed herein. The computer system 400 can further include a network interface device 408 to communicate over a network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a security component (e.g., the block folding component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
- a memory device comprising a set of blocks; and
- a processing device, operatively coupled with the memory device, to perform operations comprising:
- classifying each block in the set of blocks into one of multiple block family error avoidance (BFEA) bins based on read level shifts of blocks in the set of blocks determined from one or more BFEA scans of the set of blocks, a highest BFEA bin in the multiple BFEA bins being associated with a most severe read level shift in the set of blocks;
- performing a background scan on the set of blocks;
- identifying, based on the background scan, a block from the set of blocks that is classified in the highest BFEA bin;
- based on determining the block is classified in the highest BFEA bin, determining whether a bit error rate of the block satisfies a bit error rate threshold condition, the bit error rate threshold condition comprising a tuning parameter applied to a bit error rate threshold, the determining whether the bit error rate of the block satisfies the bit error rate threshold condition comprising determining the bit error rate of the block exceeds a product of the tuning parameter and the bit error rate threshold;
- based on the bit error rate of the block satisfying the bit error rate threshold condition, adding the block to a block folding queue; and
- performing block folding on the block based on the block being in the block folding queue.

2. The memory sub-system of claim 1, wherein:
- the block is a first block classified in a first BFEA bin;
- the bit error rate threshold condition is a first bit error rate threshold condition; and
- the operations comprise:
- identifying a second block from the set of blocks that is classified in a second BFEA bin that is not the highest bin among the multiple BFEA bins;
- based on the second block being classified in the second BFEA bin that is not the highest BFEA bin among the multiple bins, determining whether a bit error rate of the second block satisfies a second bit error rate threshold condition, the second bit error rate threshold condition comprising the bit error rate threshold without the tuning parameter being applied.

3. The memory sub-system of claim 1, wherein the operations comprise performing a BFEA scan on one or more blocks from the set of blocks prior to power down of the memory sub-system.

4. The memory sub-system of claim 1, wherein the folding of the block comprises copying valid data stored by the block to another block of the set of blocks.

5. The memory sub-system of claim 1, wherein the operations comprise determining the bit error rate of the block based on a bit error rate check performed on the block.

6. The memory sub-system of claim 1, wherein the bit error rate threshold condition comprises the product of the bit error rate threshold and the tuning parameter.

7. The memory sub-system of claim 1, wherein the operations comprise:
- receiving input to adjust the tuning parameter; and
- adjusting the tuning parameter based on the input.

8. A method comprising:
- classifying each block in a set of blocks of a memory device into one of multiple block family error avoidance (BFEA) bins based on read level shifts of blocks in the set of blocks determined from one or more BFEA scans of the set of blocks, a highest BFEA bin in the multiple BFEA bins being associated with a most severe read level shift in the set of blocks;
- performing, by a processing device, a background scan of the set of blocks of the memory device;
- identifying, by the processing device, a block from the set of blocks that is classified in the highest BFEA bin based on the background scan of the set of blocks;
- based on determining the block is classified in the highest BFEA bin, determining whether a bit error rate of the block satisfies a bit error rate threshold condition, the bit error rate threshold condition comprising a tuning parameter applied to a bit error rate threshold, the determining whether the bit error rate of the block satisfies the bit error rate threshold condition comprising determining the bit error rate of the block exceeds a product of the tuning parameter and the bit error rate threshold; and
- based on the bit error rate of the block satisfying the bit error rate threshold condition, adding the block to a block folding queue.

9. The method of claim 8, wherein:
- the block is a first block classified in a first BFEA bin;
- the bit error rate threshold condition is a first bit error rate threshold condition; and
- the method comprises:
- identifying a second block from the set of blocks that is classified in a second BFEA bin that is not the highest bin among the multiple BFEA bins;
- based on the second block being classified in the second BFEA bin that is not the highest BFEA bin among the multiple bins, determining whether a bit error rate of the second block satisfies a second bit error rate threshold condition, the second bit error rate threshold condition comprising the bit error rate threshold without the tuning parameter being applied.

10. The method of claim 8, comprising performing a BFEA scan on one or more blocks from the set of blocks prior to system power down.

11. The method of claim 8, wherein the folding of the blocks comprises copying valid data stored by the block to another block of the set of blocks.

12. The method of claim 8, comprising determining the bit error rate of the block based on a bit error rate check performed on the block.

13. The method of claim 8, wherein the bit error rate threshold condition comprises the product of the bit error rate threshold and the tuning parameter.

14. A computer-readable storage medium comprising instructions that, when executed by a processing device, configure the processing device to perform operations comprising:

classifying each block in a set of blocks of a memory device into one of multiple block family error avoidance (BFEA) bins based on read level shifts of blocks in the set of blocks determined from one or more BFEA scans of the set of blocks, a highest BFEA bin in the multiple BFEA bins being associated with a most severe read level shift in the set of blocks;

performing, by a processing device, a background scan of the set of blocks of the memory device;

identifying, by the processing device, a block from the set of blocks that is classified in a highest BFEA bin based on the background scan of the set of blocks;

based on determining the block is classified in the highest BFEA bin, determining whether a bit error rate of the block satisfies a bit error rate threshold condition, the bit error rate threshold condition comprising a tuning parameter applied to a bit error rate threshold, the determining whether the bit error rate of the block satisfies the bit error rate threshold condition comprising determining the bit error rate of the block exceeds a product of the tuning parameter and the bit error rate threshold;

based on the bit error rate of the block satisfying the bit error rate threshold condition, adding the block to a block folding queue; and folding one or more blocks in the block folding queue, the folding of the one or more blocks comprising copying valid data from the block to another block in the set of blocks.

15. The computer-readable storage medium of claim 14, wherein:

the block is a first block classified in a first BFEA bin;

the bit error rate threshold condition is a first bit error rate threshold condition; and the operations comprise:

identifying a second block from the set of blocks that is classified in a second BFEA bin that is not the highest bin among the multiple BFEA bins;

based on the second block being classified in the second BFEA bin that is not the highest BFEA bin among the multiple bins, determining whether a bit error rate of the second block satisfies a second bit error rate threshold condition, the second bit error rate threshold condition comprising the bit error rate threshold without the configurable tuning parameter being applied.

16. The computer-readable storage medium of claim 14, wherein the operations comprise performing a BFEA scan on one or more blocks from the set of blocks prior to system power down.

17. The computer-readable storage medium of claim 14, wherein the operations comprise determining the bit error rate of the block based on a bit error rate check performed on the block.

18. The computer-readable storage medium of claim 14, wherein the bit error rate threshold condition comprises the product of the bit error rate threshold and the tuning parameter.

19. The computer-readable storage medium of claim 14, wherein the operations comprise adjusting the tuning parameter based on input.

20. The method of claim 8, comprising:

receiving input to adjust the tuning parameter; and adjusting the tuning parameter based on the input.

* * * * *